US010501588B2

United States Patent
Huang et al.

(10) Patent No.: US 10,501,588 B2
(45) Date of Patent: Dec. 10, 2019

(54) GRAFTING METHOD FOR RICE STRAW FIBER MODIFICATION

(71) Applicants: Dan Huang, Wuxi (CN); Lili Zhen, Wuxi (CN); Xuehong Ren, Wuxi (CN); Hongbo Wang, Wuxi (CN)

(72) Inventors: Dan Huang, Wuxi (CN); Lili Zhen, Wuxi (CN); Xuehong Ren, Wuxi (CN); Hongbo Wang, Wuxi (CN)

(73) Assignee: Jiangnan University, Wuxi, JS (CN)

( * ) Notice: Subject to any disclaimer, the term of this patent is extended or adjusted under 35 U.S.C. 154(b) by 137 days.

(21) Appl. No.: 15/884,075

(22) Filed: Jan. 30, 2018

(65) Prior Publication Data
US 2018/0148550 A1 May 31, 2018

Related U.S. Application Data

(63) Continuation of application No. PCT/CN2015/097221, filed on Dec. 13, 2015.

(30) Foreign Application Priority Data

Aug. 18, 2015 (CN) .......................... 2015 1 0509119

(51) Int. Cl.
*C08J 3/28* (2006.01)
*C08F 2/56* (2006.01)
(Continued)

(52) U.S. Cl.
CPC ............ *C08J 3/28* (2013.01); *C08G 18/4825* (2013.01); *C08G 18/4833* (2013.01);
(Continued)

(58) Field of Classification Search
CPC . C08F 2/56; C08J 3/28; C08J 2397/02; C08G 18/7671; C08G 18/7621;
(Continued)

(56) References Cited

U.S. PATENT DOCUMENTS 3,519,581 A * 7/1970 Dougherty ......... C08G 18/6492
527/401
7,867,359 B2 * 1/2011 Medoff ................... C08B 15/02
162/158
(Continued)

FOREIGN PATENT DOCUMENTS

CN 103965485 A * 8/2014
CN 104479101 A * 4/2015
(Continued)

OTHER PUBLICATIONS

Stéphanie Laurichesse, Luc Avérous, Chemical modification of lignins: Towards biobased polymers, Progress in Polymer Science, vol. 39, Issue 7, (Year: 2014).*
(Continued)

*Primary Examiner* — Sanza L. McClendon
(74) *Attorney, Agent, or Firm* — Lili Chen

(57) ABSTRACT

The present invention relates to the field of reutilization of biomass resources, and more particularly relates to a grafting method for rice straw fiber modification. The pulverized and pretreated straw powder is first reacted with diisocyanate under ultrasonic and microwave treatment, and the resulting product is reacted with PEG to obtain the PEG grafted straw fiber polymer compound. Grafting PEG onto the straw fiber through the bridging of the diisocyanate improves the thermoplasticity of the modified rice straw fiber. The modified straw fiber of the present invention can be hot-pressed to form self-reinforced composite materials without adding additional materials, which overcomes the waste and pollution problem of traditional straw reutilization method, achieving the goal of whole straw utilization.

4 Claims, 1 Drawing Sheet

(51) Int. Cl.
*C08H 8/00* (2010.01)
*C08G 18/48* (2006.01)
*C08G 18/76* (2006.01)
*C08G 18/64* (2006.01)

(52) U.S. Cl.
CPC ..... *C08G 18/6484* (2013.01); *C08G 18/6492* (2013.01); *C08G 18/7621* (2013.01); *C08G 18/7657* (2013.01); *C08G 18/7671* (2013.01); *C08H 8/00* (2013.01); *C08J 2397/02* (2013.01)

(58) Field of Classification Search
CPC ............ C08G 18/6484; C08G 18/8433; C08G 18/4825; C08G 18/7656; C08H 8/00
See application file for complete search history.

(56) References Cited

U.S. PATENT DOCUMENTS

| | | | |
|---|---|---|---|
| 2005/0176913 A1* | 8/2005 | Gillis | C08G 18/10 528/44 |
| 2017/0225355 A1* | 8/2017 | Kumar | C08G 18/20 |

FOREIGN PATENT DOCUMENTS

| | | | | |
|---|---|---|---|---|
| CN | 104530383 A | * | 4/2015 | |
| CN | 104892958 A | * | 9/2015 | |
| CN | 106220820 A | * | 12/2016 | |
| CN | 109021797 A | * | 12/2018 | |
| KR | 20180002125 A | * | 1/2018 | ........... C12N 5/0606 |
| WO | WO-2010009992 A1 | * | 1/2010 | ............ B27N 1/006 |

OTHER PUBLICATIONS

H.D. Rozman, Y.S. Yeo, G.S. Tay, A. Abubakar,The mechanical and physical properties of polyurethane composites based on rice husk and polyethylene glycol, Polymer Testing, vol. 22, Issue 6, (Year: 2003).*
Patrícia Figueiredo, Kalle Lintinen, Jouni T. Hirvonen, Mauri A. Kostiainen, Hélder A. Santos, Properties and chemical modifications of lignin: Towards lignin-based nanomaterials for biomedical applications, Progress in Materials Science, vol. 93, (Year: 2018).*
Yunyun Yang, Weibo Kong, Xufu Cai, Solvent-free preparation and performance of novel xylitol based solid-solid phase change materials for thermal energy storage, Energy and Buildings, vol. 158, (Year: 2018).*
Xiaodong et al. J. Mater. Chem., 2009,19, 7137-7145 (Year: 2009).*
Xanxiang Li, Min Wu, Ruigang Liu, Yong Huang. Cellulose-based solid-solid phase change materials synthesized in ionic liquid. Solar Energy Mtaterials and Solar Cells. vol. 93, (8), pp. 1321-1328, (Year: 2009).*

* cited by examiner

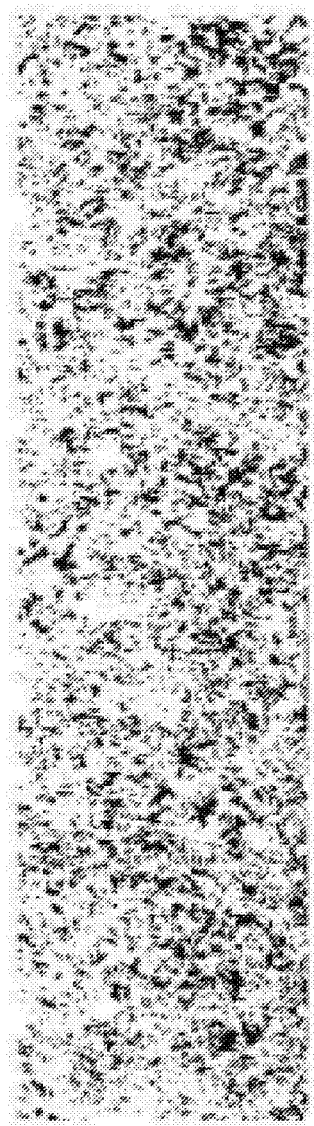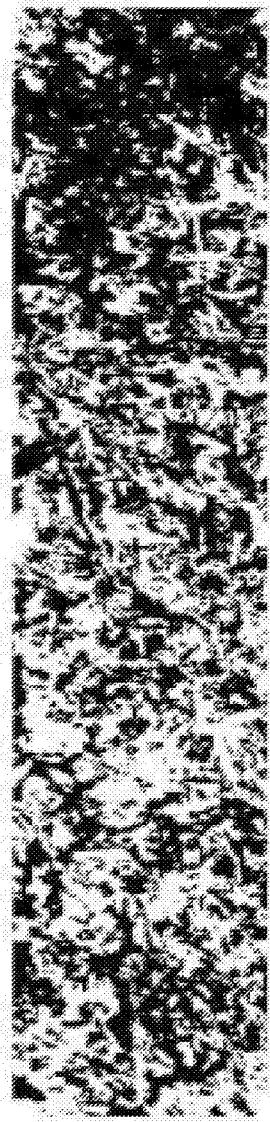

GRAFTING METHOD FOR RICE STRAW FIBER MODIFICATION

CROSS-REFERENCES AND RELATED APPLICATIONS

This application is a continuation application of international application No. PCT/CN2015/097221, filed Dec. 13, 2015, which claims the benefit of priority to Chinese Application No. 201510509119.6, entitled "A Grafting Method for Rice Straw Fiber Modification", filed Aug. 18, 2015 and which are herein incorporated by reference in their entirety.

BACKGROUND OF THE INVENTION

Field of the Invention

The present invention belongs to the field of recycling biomass resources. In particular, it relates to a grafting modification method for changing the thermoplastic properties of rice straw fibers.

Description of the Related Art

As the reminder of an annual crop, the rice straw stalk is a rich resource for materials. The main chemical compositions of these straw fibers are cellulose, emicellulose and lignin. There are a large number of hydroxyl groups on the surface of cellulose, which is easy to absorb water and form intra-molecular and intermolecular hydrogen bonds. They can form certain crystal lattices by lateral association among the molecular chains. Cellulose with high crystallinity (60%-70%) is surrounded by a matrix of hemicelluloses and three-dimensional network of lignin macromolecules, which are chemically bonded to form a reinforced structure. Therefore, the melting point of straw fiber is much higher than its decomposition temperature. It is insoluble and difficult to melt, and lacks the flow processing and melt processing properties. These disadvantages have greatly limited application of rice straw fibers as industrial materials. It is usually used only as the reinforcement or filler in composite materials. However, the composite materials use a large amount of non-biodegradable thermoplastic or thermosetting petrochemical products, and many rice straw composite materials cause the release of carcinogens such as formaldehyde in the process of production and application.

There are reports of using renewable natural polymer adhesives such as starch, soybean and protein, which have the advantages of easy access, low costs and being biodegradable. The common disadvantages of these adhesives are low bonding strength, poor water resistance, poor storage instability, and prone to get damp and moldy. Modification or addition of chemical additives is often necessary. For example, blending urea-formaldehyde resin and phenolic resin is used to improve the water resistance of starch, or formaldehyde is used as a cross-linking agent in starch modification for forming a multi-dimensional network structure. But this method introduces the toxic substances like formaldehyde, which defeats the original purpose of using natural starch adhesive. Therefore, the research and development of environmental friendly and sustainable straw composite materials have attracted widespread attention in recent years.

The purpose of the present invention is to enhance thermoplasticity of the rice straw fiber (rice straw, abbreviated as RS) by chemical modification. The modification is carried out by grafting PEG onto the rice straw fiber via diisocyanate bridging to prepare RS/PEG grafted copolymer. Synergistic synthesis method combining ultrasonic and microwave techniques was also used. By introducing flexible polyethylene glycol chain onto the straw fibers, the aggregation state and the thermal properties of the RS fiber are significantly changed, thus providing a method of utilizing rice straw whole biomass.

DETAILED DESCRIPTION

The object of the present invention is to develop a method for converting the abundantly available rice straws into straw fiber/PEG grafted macromolecule compounds, which can greatly increase the value of the straw products, overcoming the shortcomings of traditional wasteful and pollution causing methods for straw reutilization.

The method for modifying rice straws to increase the thermoplasticity via graft polymerization of PEG onto rice straw fibers is as follows.

Pretreatment of Straw

1) Preparation of straw powder: the whole rice straw is milled in a crushing machine (FZ-102) to 20 to 60 mesh. The powdered straw is soaked in water for 24 hr, filtered and cleaned by ethanol and deionized water twice to remove the soil in the straw. The washed straw powder is then suction filtered and dried in a vacuum oven.

2) High temperature pretreatment method: 8 g washed straw powder and 100 mL $H_2O$ are added into a reactor, and treated at 160° C. and one atmospheric pressure for 1 hr. The treated straw fibers are washed with water and ethanol, and filtered and dried at 80° C. in vacuum.

3) Microwave pretreatment method: 8 g washed straw powder and DMSO is added into a three-necked flask, and treated at 60° C. for 1-2 hr in a microwave with a power of 100, 200, 300 or 400 W. The treated straw fibers are washed with water and ethanol, and dried at 80° C. in vacuum.

4) Ultrasonic pretreatment method: 8 g washed straw powder is added into a special three-necked flask and DMSO is added as solvent. The liquid surface is 1 cm~2 cm higher than the ultrasonic probe. The mixture is treated at 60° C. for 1 hr with a ultrasonic power of 300, 400, 500, 600, 700 or 800 W. The treated straw fibers are washed with ethanol and deionized water and dried at 80° C. in vacuum.

5) Ultrasonic-microwave co-pretreatment method: 8 g washed straw powder is added into a special three-necked flask and DMSO is added as solvent. The liquid surface is 1 cm~2 cm higher than the ultrasonic probe. The mixture is treated at 60° C. for 1 hr with a microwave power of 100 or 200 W and a ultrasonic power of 300, 400 or 500 W. The treated straw fibers are washed with ethanol and deionized water and dried at 80° C. in vacuum.

The pretreated straw powder is analyzed by infrared spectroscopy, scanning electron microscopy and XRD. The contents of total cellulose, lignin and cellulose in straw powder before and after pretreatment are determined. The results show that the best pretreatment method is to treat at 60° C. for 1 hr with a ultrasonic power of 300 W and a microwave power of 100 W. The contents of holocellulose, lignin and cellulose in the pretreated straw powder are 61.23%, 15.93% and 41.77%, respectively.

Grafting PEG onto Rice Straw Fibers

1) A certain amount of completely dried pretreated straw powder is added into a three-necked flask and an appropriate amount of anhydrous DMSO and diisocyanate (TDI (Toluene diisocyanate) or MDI (Methylene diphenyl diisocyanate)) are added until ultrasonic probe is immersed in the reaction solution from the middle neck of the three-necked flask at least 2 cm below the surface of the solution. N₂ is used to remove the O₂. The microwave power is set at 250, 300, 350 or 400 W, the ultrasonic power is set at 180, 270, 360 or 450 W, the temperature is set at 60° C., and the treatment time is set at 50, 60, 70 or 80 min. One end of the diisocyanate is attached to the hydroxyl group of the straw fiber to form an amide bond, and RS-TDI or RS-MDI is prepared.

2) An appropriate amount of PEG is added to the reaction system, and the reaction mixture is treated at 60° C. for a time period of 50, 60, 70 or 80 min, with an microwave power of 250, 300, 350 or 400 W and an ultrasonic power of 270, 360, 450 or 540 W. The other end of the diisocyanate is reacted with PEG to produce RS-TDI-PEG or RS-MDI-PEG polymers.

3) After the reaction, an appropriate amount of ethanol is added into the reaction product until white turbidity appears. The reaction system is kept still for half an hour and the upper emulsion is removed. The reaction mixture is then filtered, washed twice by ethanol, washed twice by deionized water, filtered again, dried at 80° C. in vacuum for 12 hr. The crude product is thus obtained.

4) The crude product is purified with toluene extraction for 12 hr using a Soxhlet extractor at 120° C., and then washed with absolute ethanol and deionized water, dried at 80° C. in vacuum for 12 hr. The final product of straw fiber/PEG grafted polymer compound is thus obtained. The rates of grafting and weight gain are calculated according to the following formula:

$$DG(\%) = \frac{M_1 - M}{M} \times 100$$

$$Wt(\%) = \frac{M_1 - M}{M_1} \times 100$$

Where DG—grafting, %
Wt—weight gain, %
M—the quality of the straw fiber before grafting, g
M1—the quality of the straw fiber after grafting, g The effects of microwave power, ultrasonic power, reaction time and the amount of reactants on the grafting effect are investigated. Table 1 shows the results of grafting PEG onto straw fiber by MDI.

The parameters of the efficient grafted straw fiber are as follows: the mass ratio of PEG to straw fiber is 1:2.0, the molar ratio of diisocyanate to PEG is 1:1; the reaction of straw and diisocyanate in the first step is carried out at 60° C. for 60 min with the microwave power of 300 W and the ultrasonic power of 270 W; the reaction of RS-MDI (or RS-TDI) and PEG is carried out at 60° C. for 70 min with the microwave power of 300 W and the ultrasonic power of 360 W.

The PEG grafted straw fiber has good thermoplasticity, and it could be hot pressed to form self-reinforced composite materials (shown in FIG. 1) without adding any additional materials. The hot press is carried out by a hot press machine (CARVER company, USA) at 180° C., 10 MPa for 5 min and then cooled down to form self-reinforced composite material.

TABLE 1

Effects of reaction conditions on grafting PEG onto rice straw fibers

| Group | Strw:MDI:PEG (Mass ratio) | Crosslinking reaction | | | Grafting Reaction | | | DG % | WT % |
|---|---|---|---|---|---|---|---|---|---|
| | | US./W | MW./W | t/min | US./W | MW./W | t/min | | |
| 1 | 1:0.69:1.1 | 270 | 250 | 60 | 360 | 300 | 60 | 3.1 | 3.0 |
| 2 | 1:0.69:1.1 | 270 | 300 | 60 | 360 | 300 | 60 | 16.7 | 14.3 |
| 3 | 1:0.69:1.1 | 270 | 350 | 60 | 360 | 300 | 60 | 6.3 | 5.9 |
| 4 | 1:0.69:1.1 | 270 | 400 | 60 | 360 | 300 | 60 | 3.7 | 3.6 |
| 5 | 1:0.69:1.1 | 180 | 300 | 60 | 360 | 300 | 60 | 15.4 | 13.4 |
| 6 | 1:0.69:1.1 | 360 | 300 | 60 | 360 | 300 | 60 | 15.8 | 13.7 |
| 7 | 1:0.69:1.1 | 450 | 300 | 60 | 360 | 300 | 60 | 15.6 | 13.5 |
| 8 | 1:0.69:1.1 | 270 | 300 | 10 | 360 | 300 | 60 | 5.6 | 5.3 |
| 9 | 1:0.69:1.1 | 270 | 300 | 20 | 360 | 300 | 60 | 7.1 | 6.6 |
| 10 | 1:0.69:1.1 | 270 | 300 | 30 | 360 | 300 | 60 | 9.3 | 8.5 |
| 11 | 1:0.69:1.1 | 270 | 300 | 50 | 360 | 300 | 60 | 12.3 | 11.0 |
| 12 | 1:0.69:1.1 | 270 | 300 | 60 | 360 | 300 | 60 | 16.7 | 14.3 |
| 13 | 1:0.69:1.1 | 270 | 300 | 70 | 360 | 300 | 60 | 10.6 | 9.6 |
| 14 | 1:0.69:1.1 | 270 | 300 | 80 | 360 | 300 | 60 | 9.5 | 8.7 |
| 15 | 1:0.69:1.1 | 270 | 300 | 60 | 360 | 250 | 60 | 15.2 | 13.2 |
| 16 | 1:0.69:1.1 | 270 | 300 | 60 | 360 | 350 | 60 | 12.2 | 10.9 |
| 17 | 1:0.69:1.1 | 270 | 300 | 60 | 360 | 400 | 60 | 8.6 | 7.9 |
| 18 | 1:0.69:1.1 | 270 | 300 | 60 | 270 | 300 | 60 | 10.7 | 9.7 |
| 19 | 1:0.69:1.1 | 270 | 300 | 60 | 450 | 300 | 60 | 12.7 | 11.3 |
| 20 | 1:0.69:1.1 | 270 | 300 | 60 | 540 | 300 | 60 | 10.7 | 9.7 |
| 21 | 1:0.69:1.1 | 270 | 300 | 60 | 360 | 300 | 50 | 15.1 | 13.1 |
| 22 | 1:0.69:1.1 | 270 | 300 | 60 | 360 | 300 | 60 | 16.7 | 14.3 |
| 23 | 1:0.69:1.1 | 270 | 300 | 60 | 360 | 300 | 70 | 21.1 | 17.4 |
| 24 | 1:0.69:1.1 | 270 | 300 | 60 | 360 | 300 | 80 | 20.0 | 16.7 |
| 25 | 1:0.94:1.5 | 270 | 300 | 60 | 360 | 300 | 70 | 29.5 | 22.8 |
| 26 | 1:1.25:2.0 | 270 | 300 | 60 | 360 | 300 | 70 | 42.5 | 29.8 |
| 27 | 1:1.57:2.5 | 270 | 300 | 60 | 360 | 300 | 70 | 42.2 | 29.7 |

Note:
the molar ratio of MDI to PEG is 1:1

BRIEF DESCRIPTION OF FIGURES

FIG. 1. Digital images of exemplary hot-pressing plates made of PEG grafted straw fibers of the invention.

EXAMPLES

Example 1

8 g washed straw powder was added into a special three-necked flask and DMSO was added as solvent. The liquid surface was kept at 1-2 cm higher than the ultrasonic probe. The mixture was treated at 60° C. for 60 min with a ultrasonic power of 300 W and a microwave power of 100 W. The treated straw fibers are washed with ethanol and deionized water, and dried at 80° C. in vacuum.

3.0 g straw powder pretreated above was added with an appropriate amount of anhydrous DMSO until the liquid surface was 1~2 cm higher than the ultrasound pitch head, and 3.75 g MDI was then added. $N_2$ was used to remove the $O_2$. The reaction of straw and MDI was carried out at 60° C. for 60 min with the microwave power of 300 W and the ultrasonic power of 270 W. 6.0 g PEG-400 was then added to the system, and the reaction was carried out at 60° C. for 70 min with the microwave power of 300 W and the ultrasonic power of 360 W. After the reaction, the product was added to a beaker with an appropriate amount of ethanol, allowed to stand still and precipitate to remove the upper emulsion. The product was then filtered, washed twice by ethanol and deionized water, filtered again, and dried at 80° C. in vacuum for 12 hr. The crude product was thus obtained. The crude product was extracted by toluene using soxhlet extraction at 120° C. for 12 hr, and the extract was washed with absolute ethanol and deionized water, and dried at 80° C. in vacuum for 12 hr. Finally, 4.280 g PEG grafted straw fiber polymer compound (RS-MDI-PEG) was obtained (DG %: 42.7% and Wt %: 29.9%).

Without adding additional materials, the RS-MDI-PEG was hot pressed at 180° C., 10 MPa for 5 min using a hot press machine (CARVER, United States) and cooled down to form a self-reinforced composite material.

Example 2

5 g washed straw powder was added into a special three-necked flask and DMSO was added as solvent. The liquid surface was kept 1~2 cm higher than the ultrasonic probe. The mixture was treated at 60° C. for 60 min with a ultrasonic power of 300 W and a microwave power of 100 W. The treated straw fibers are washed with ethanol and deionized water, and dried at 80° C. in vacuum.

3.0 g straw powder pretreated above was added with an appropriate amount of anhydrous DMSO until the liquid surface was 1~2 cm higher than the ultrasound pitch head and 3.75 g MDI was added. $N_2$ was used to remove the $O_2$. The reaction of straw and MDI was carried out at 60° C. for 60 min with the microwave power of 300 W and the ultrasonic power of 270 W. 6.0 g PEG-400 was then added to the system, and a reaction was carried out at 60° C. for 70 min with the microwave power of 300 W and the ultrasonic power of 360 W. After the reaction, the product was added to a beaker with an appropriate amount of ethanol, allowed to stand still and precipitate to remove the upper emulsion. The product was filtered, washed twice by ethanol and deionized water, filtered again, and dried at 80° C. in vacuum for 12 hr. The crude product was thus obtained. The crude product was extracted by toluene using soxhlet extraction at 120° C. for 12 hr. The extract was washed with absolute ethanol and deionized water, dried at 80° C. in vacuum for 12 hr. Finally, 4.275 g PEG grafted straw fiber polymer compound (RS-MDI-PEG) was obtained (DG %: 42.5% and Wt %: 29.8%).

Without adding additional materials The RS-MDI-PEG was hot pressed at 180° C., 10 MPa for 5 min by a CARVER hot press machine and cooled down to obtain a self-reinforced composite material.

Example 3

5 g washed straw powder was added into a special three-necked flask and DMSO was added as solvent. The liquid surface was kept 1~2 cm higher than the ultrasonic probe. The mixture was treated at 60° C. for 60 min with a ultrasonic power of 300 W and a microwave power of 100 W. The treated straw fibers are washed with ethanol and deionized water, and dried at 80° C. in vacuum.

3.0 g straw powder pretreated above was added with an appropriate amount of anhydrous DMSO until the liquid surface was 1~2 cm higher than the ultrasound pitch head, and 2.61 g TDI was added. $N_2$ was used to remove the $O_2$. The reaction of straw and TDI was carried out at 60° C. for 60 min with the microwave power of 300 W and the ultrasonic power of 270 W. 6.0 g PEG-400 was then added to the system, and a reaction was carried out at 60° C. for 70 min with the microwave power of 300 W and the ultrasonic power of 360 W. After the reaction, the product was added to a beaker with an appropriate amount of ethanol, allowed to stand still and precipitate to remove the upper emulsion. The product was filtered, washed twice by ethanol and deionized water, filtered again, and dried at 80° C. in vacuum for 12 hr. The crude product was thus obtained. The crude product was extracted by toluene using soxhlet extraction at 120° C. for 12 hr. The extract was washed with absolute ethanol and deionized water, dried at 80° C. in vacuum for 12 hr. Finally, 4.261 g PEG grafted straw fiber polymer compound (RS-TDI-PEG) was obtained (DG %: 42.0% and Wt %: 29.6%).

Without adding additional materials, the RS-TDI-PEG was hot pressed at 180° C., 10 MPa for 5 min by a CARVER hot press machine and cooled down to obtain a self-reinforced composite material.

Example 4

5 g washed straw powder was added into a special three-necked flask and DMSO was added as solvent. The liquid surface was kept 1~2 cm higher than the ultrasonic probe. The mixture was treated at 60° C. for 60 min with a ultrasonic power of 300 W and a microwave power of 100 W. The treated straw fibers are washed with ethanol and deionized water, and dried at 80° C. in vacuum.

3.0 g straw powder pretreated above was added with an appropriate amount of anhydrous DMSO until the liquid surface was 1~2 cm higher than the ultrasound pitch head, and 2.612 g TDI was added. $N_2$ was added to remove the $O_2$. The reaction of straw and TDI was carried out at 60° C. for 60 min with the microwave power of 300 W and the ultrasonic power of 270 W. 6.0 g PEG-400 was then added to the system, and a reaction was carried out at 60° C. for 70 min with the microwave power of 300 W and the ultrasonic power of 360 W. After the reaction, the product was added to a beaker with an appropriate amount of ethanol, allowed to stand still and precipitate to remove the upper emulsion. The product was filtered, washed twice by ethanol and deionized water, filtered again, and dried at 80° C. in vacuum for 12 hr. The crude product was thus obtained. The crude product was extracted by toluene using soxhlet extraction at 120° C. for 12 hr. The extract was washed with absolute ethanol and deionized water, dried at 80° C. in vacuum for 12 hr. Finally, 4.30 g PEG grafted straw fiber polymer compound (RS-TDI-PEG) was obtained (DG %: 43.3% and Wt %: 30.2%).

Without adding additional materials, the RS-TDI-PEG was hot pressed at 180° C., 10 MPa for 5 min by a CARVER hot press machine and cooled down to obtain a self-reinforced composite material.

While the present invention has been described in some detail for purposes of clarity and understanding, one skilled in the art will appreciate that various changes in form and detail can be made without departing from the true scope of the invention. All figures, tables, appendices, patents, patent applications and publications, referred to above, are hereby incorporated by reference.

What is claimed is:

1. A Polyethylene Glycol (PEG) grafting method for rice straw fiber modification, comprising pretreating the rice straw, grafting diisocyanate to the pretreated rice straw by a simultaneous treatment of microwave and ultrasound power, and grafting PEG to the diisocyanate grafted rice straw by another microwave and ultrasound treatment.

2. The method of claim 1, comprising the steps of:
 1) pretreating the rice straw as follows: the rice straw, which has been soaked in water, cleaned and dried, is crushed to 20 to 60 mesh powder; and the rice straw powder is added to DMSO, treated at 60° C. for 60 min with a microwave power of 100 W and a ultrasonic power of 300 W, cleaned with ethanol and water, and dried in vacuum to obtain a pretreated straw powder;
 2) grafting diisocyanate to the rice straw as follows: the pretreated straw powder is added to anhydrous DMSO; $N_2$ is used to remove the $O_2$; diisocyanate is then added to make a reaction mixture; the reaction mixture is reacted at 60° C. for 10-80 min with a microwave power of 250-400 W and an ultrasonic power of 180-450 W; and
 3) grafting of PEG as follows: PEG is added to the reaction mixture of step 2), and is treated at 60° C. for 50-80 min with a microwave power of 250-400 W and an ultrasonic power of 270-540 W; the resulting product is added to ethanol, which is allowed to stand still and precipitate to remove an upper emulsion; the obtained product is then filtered, washed twice by ethanol and deionized water, and filtered again to obtain a crude product; and the crude product is dried at 80° C. in vacuum for 12 hr and extracted by toluene using soxhlet extraction at 120° C. for 12 hr to obtain a final product of PEG grafted straw fiber polymer compound.

3. The method of claim 2, wherein the diisocyanate used in step 2) is TDI or MDI, and the molar ratio of diisocyanate to PEG is 1:1, and wherein the reaction is carried out at 60° C. for 60 min with a ultrasonic power of 270 W and a microwave power of 300 W in step 2).

4. The method of claim 2, wherein the mass ratio of PEG to straw fiber is 1:2, and wherein the reaction is carried out at 60° C. for 70 min with a ultrasonic power of 360 W and a microwave power of 300 W in step 3).

* * * * *